United States Patent [19]

de Jong et al.

[11] Patent Number: 5,139,990

[45] Date of Patent: Aug. 18, 1992

[54] PROCESS FOR THE PREPARATION OF A RESULFIDED CATALYST

[75] Inventors: Jan I. de Jong, Blaricum, Netherlands; Ludwig Eisenhuth, Obernburg, Fed. Rep. of Germany; Johannes W. F. M. Schoonhoven, Leusden; Antonius J. van Hengstum, Deventer, both of Netherlands

[73] Assignee: Akzo NV, Arnhem, Netherlands

[21] Appl. No.: 672,253

[22] Filed: Mar. 20, 1991

Related U.S. Application Data

[63] Continuation-in-part of Ser. No. 387,466, Jul. 28, 1989, abandoned.

[30] Foreign Application Priority Data

Jul. 29, 1988 [NL] Netherlands ............... 8801907

[51] Int. Cl.$^5$ ............................................. B01J 27/043
[52] U.S. Cl. ..................................... 502/216; 502/219; 502/220; 502/221; 502/222; 502/223; 208/215
[58] Field of Search ............... 502/216, 219, 220, 221, 502/222, 223; 208/215

[56] References Cited

U.S. PATENT DOCUMENTS

| | | | |
|---|---|---|---|
| 3,477,963 | 11/1969 | Van Venrooy | 502/216 |
| 3,959,179 | 5/1976 | Mikovsky et al. | 502/216 |
| 4,005,007 | 1/1977 | O'Hara | 208/111 |
| 4,020,012 | 4/1977 | Miura et al. | 502/216 |
| 4,320,030 | 3/1982 | Happel et al. | 578/714 |
| 4,581,125 | 4/1986 | Stiefel et al. | 208/134 |
| 4,622,128 | 11/1986 | Young et al. | 208/112 |
| 4,663,023 | 5/1987 | McCandlish et al. | 208/215 |
| 4,808,394 | 2/1989 | Kolts et al. | 423/437 |
| 4,814,315 | 3/1989 | Kukes et al. | 502/220 |
| 5,017,535 | 5/1991 | Schoonhoven et al. | 502/220 |
| 5,045,518 | 9/1991 | Heinerman et al. | 502/220 |

Primary Examiner—Anthony McFarlane
Attorney, Agent, or Firm—Louis A. Morris

[57] ABSTRACT

Ex situ presulfidation of hydrotreating catalysts comprising impregnating the catalysts with an aqueous solution of an organic sulfur compound, e.g. the diammonium salt of 2,5-dimercapto-1,3,4-thiadiazole and 2,2'-dithiodiethanol, followed by drying of the impregnated material. The dried material is activated by contacting it with hydrogen gas at elevated temperature.

2 Claims, No Drawings

PROCESS FOR THE PREPARATION OF A RESULFIDED CATALYST

CROSS REFERENCE TO RELATED APPLICATION

This application is a continuation-in-part of my prior copending application Ser. No. 07/387,466, filed Jul. 28, 1989, now abandoned, incorporated herein by reference.

BACKGROUND OF THE INVENTION

1. Field of the Invention

The field of art to which this invention pertains is the preparation of catalyst for the hydrotreatment of hydrocarbon-containing feeds. The invention relates to a process for the preparation of a presulfided catalyst, a process for the preparation of a sulfided catalyst, and the use of said sulfided catalyst in the catalytic hydrotreatment of hydrocarbon-containing feeds.

2. Prior Art

In the oil industry many processes are known in which hydrocarbon-containing feeds are catalytically treated with hydrogen, such as hydrodesulfurization, hydrodenitrogenation, and hydrocracking. In such processes use is made of catalysts built up from a carrier material, such as alumina, on which there are deposited one or more catalytically active metals or compounds thereof; examples of such metals are molybdenum, nickel, cobalt and tungsten.

It is common knowledge that optimum results are obtained in using such catalysts when the catalytically active metals are in their sulfided form. See for instance H. Hallie's article in Oil & Gas Journal, Dec. 20, 1982, Technology, pp. 69-74, which also describes several techniques for preparing sulfided catalysts. These techniques comprise treating a fresh catalyst in a reactor at elevated temperature with a combination of hydrogen sulfide and hydrogen, a naturally sulfurous feed (non-spiked feed), or a feed to which a sulfur compound, such as carbon disulfide or dimethyldisulfide, has been added (spiked feed).

Although these techniques are practiced on a large scale, they nevertheless display several drawbacks. For instance, they require accurate control to achieve the desired result and are time-consuming, and the sulfur compounds used cause odor nuisance. Moreover, protracted interruption of the actual hydrotreatment of the hydrocarbons is needed if, as is often the case in actual practice, the reactor in which these processes are carried out is used for sulfiding catalysts.

To meet these drawbacks it is proposed in European patent application No. 0,153,233 that the fresh catalyst or a regenerated one should be contacted ex situ, i.e. outside the reactor in which the actual hydrotreatment of hydrocarbon-containing feeds is carried out, with an aqueous solution of diammonium sulfide, and the resulting material be dried to obtain a presulfided catalyst, whereupon the resulting presulfided catalyst is activated in situ or not in the presence of hydrogen, i.e. is brought into the sulfided state. This proposal also has its drawbacks, however. Firstly, aqueous diammonium sulfide is a reagent which produces an extremely objectionable odor. Secondly, if the total amount of the catalytically active metal is to be brought into the sulfided form, then, according to the teachings of the patent specification, the presulfiding should comprise at least two impregnating steps with the aqueous diammonium sulfide; in this process each impregnating step should be followed by a drying step, and the final drying step should preferably be carried out in an inert atmosphere, such as nitrogen. A disadvantage to such a preparative process is its laboriousness when used in actual industrial practice. Thirdly, it has been found that the drying during the preparation of catalysts according to said patent specification is attended with the release of hydrogen sulfide, causing environmental problems. Finally, it has been found that these catalysts display an objectionably poor activity.

U.S. Pat. No. 3,477,963 (Van Venrooy) describes the sulfiding of hydrotreating catalyst. Van Venrooy requires first transforming an organic sulfur compound into a mixture of gases (by passing it over a presulfided catalyst) comprising $H_2S$, $CH_4$, $CH_3$—SH and $CH_3$—S—$CH_3$. It is this mixture of gases that is contacted with the unsulfided catalyst in a second step or stage.

U.S. Pat. No. 4,814,315 (Kukes et al.); 4,020,012 (Miura et al.) and 3,959,179 (Mikovski et al.) are typical of prior art references which require calcining of presulfided catalysts in air prior to any contact of the catalyst with a reducing atmosphere. This results in the finished catalyst containing little if any of the catalytically active metals being in their sulfided form. As mentioned above, optimum results for use of such catalysts will be realized only when the catalysts are in their sulfided form.

U.S. Pat. No. 4,320,030 (Happel et al.) describes making particles of active metal salts obtained from a solution of such salts in molten ammonium thiocyanate or thiourea (no carrier material is employed). Water is removed from the solution and the mixture heated to decompose the organic sulfur compounds and the mixture heated to decompose the organic sulfur compounds and evolve gases including sulfur dioxide and yield a black solid mass. Eventually, particles of this mass are heated in a reducing atmosphere. This reference teaches that the organic sulfur compound is a precursor for hydrogen sulfide.

U.S. Pat. No. 4,845,068 (Takahashi et al.) describes the use of organic thiol-group-containing organic acids to presulfide hydrotreating catalysts which are then activated with hydrogen gas at elevated temperature.

SUMMARY OF THE INVENTION

The present invention has for its primary object to meet the drawbacks to the teachings of the above prior art.

Accordingly, the invention is a process for the preparation of a catalyst useful in the catalytic hydrotreatment of hydrocarbon-containing feeds comprising:
 a) obtaining a catalyst comprising a carrier material having deposited thereon one or more metals or metal compounds catalytically active for the hydrotreatment of hydrocarbon-containing feeds:
 b) contacting the catalyst of step a) with an aqueous medium containing an organic sulfur compound to incorporate an effective amount of the organic sulfur compound into the catalyst; the organic sulfur compound being selected from the group consisting of salts of ethylene bis(dithiocarbamic acid), salts of 2,5-dimercapto-1,3,4-thiadiazole, salts of dimethyldithiocarbamic acid, thiourea, ammonium thiocyanate, dimethyl sulfoxide, 3,4-dithia adipic acid, salts of 3,4-dithia adipic acid, and 2,2'-dithiodiethanol;

c) drying the sulfur-containing catalyst of step b); and
d) activating the dried sulfur-containing catalyst of step c) by contacting said catalyst with hydrogen gas at a temperature of from 100° C. to 600° C.

It is essential that calcining not be effected between steps b) and d).

DETAILED DESCRIPTION

The present invention enables catalysts having a relatively high sulfur content to be prepared in a simpler manner than is described in EP-A 0,153,233, and, moreover, they do not cause odor nuisance during their preparation and display a greater activity during the hydrotreatment of hydrocarbon-containing feeds than do those according to the teachings of said patent specification.

As compared to the above prior art which teaches calcination (heating in air at a temperature and conditions sufficient to cause a loss of sulfur which is significant with respect to a loss of catalytic desulfurizing activity) of the catalyst between the impregnation with the organic sulfur step and the activation step the process of the present invention yields a catalyst having a very high sulfur retention. This sulfur, when present in the hydrotreating reactor, will enable good activity.

With regard to Takahashi et al., it has been found that the thiol-group-containing organic acids disclosed by that reference for effecting presulfiding cause corrosion in the hydrotreating reactor. The organic sulfur compounds employed in the process of the present invention do not exhibit that undesirable property.

The fresh or regenerated catalysts to be presulfided according to the process of the invention are those which are known in the prior art as suited for use in sulfided form in the catalytic hydrotreatment of hydrocarbon-containing feeds, for instance in hydrodesulfurization, hydrodenitrogenation, hydrodemetallization, hydroreforming (which process, in the present context, is also considered a hydrotreatment), hydroisomerization, hydrocracking, hydroalkylation, and hydrodealkylation. Such catalysts commonly contain a carrier material, such as alumina, silica, silica-alumina, or crystalline aluminosilicate, with deposited thereon one or more metals or compounds of metals, such as oxides, the metals being selected from the groups Ib, Vb, VIb, VIIb, and VIII of the Periodic System. Typical examples of these metals are iron, cobalt, nickel, tungsten, molybdenum, chromium, vanadium, copper, palladium, and platinum as well as combinations thereof. Preference is given to molybdenum, tungsten, nickel, cobalt, platinum and palladium and combinations thereof. The metal content of the catalysts generally is 0.1–30% by weight, calculated on the weight of the total catalyst.

In addition, the catalysts may still contain other components, such as phosphorus, halogen, barium, zeolites and clays—including pillared clays.

The shape of the catalysts is dependent on the process in which they are used. Most frequently used are extruded particles (cylindrical, polylobes) and also fluidizable particles.

The sulfur compound to be used is organic, i.e. having at least one carbon atom in the molecule. The compound is either water-soluble or water-miscible. These compounds permit the preparation of aqueous mediums which at 25° C. and per 100 ml contain at least 1, preferably at least 2, and more particularly as least 3 g of homogeneously distributed sulfur, i.e. the compound is fully dissolved or mixed.

The compounds to be used are
salts of ethylene bis(dithiocarbamic acid),
salts of 2,5-dimercapto-1,3,4-thiadiazole,
salts of dimethyldithiocarbamic acid,
thiourea,
ammonium thiocyanate,
dimethyl sulfoxide,
3,4-dithia adipic acid and salts thereof, or
2,2'-dithiodiethanol.

Also, use may be made of combinations of the above compounds.

Preference is given to sulfur compounds with at least two sulfur atoms in the molecule.

It should be noted that when a salt of a sulfur compound is used in the presulfiding process according to the invention, it must not be an alkali metal salt or an earth alkali metal salt. It is common knowledge that alkali metal ions and earth alkali metal ions in catalysts have a negative effect on the catalytic action. Salts that are preferred, also for reasons of economy, are ammonium salts and mono-, di-, tri-, and tetra alkyl ammonium salts. The methyl group is the most suited alkyl group.

Use may be made of conventional impregnation methods for contacting the fresh or regenerated catalyst with the aqueous medium containing the organic sulfur compound, for instance immersion, impregnation by spraying, impregnation by vacuum and soaking.

The length of this treatment may range from several minutes to several hours.

In general the impregnation will be carried out at room temperature. Optionally, however, the operation may also take place at higher temperatures.

The amount of sulfur compound to be used is dependent on the degree of sulfiding desired for the ready-for-use catalyst. Conventional degrees of sulfiding are in the range of 0.5 × stoichiometric to 1.5 × stoichiometric, on which basis it is easy for the skilled man to determine the amount of sulfur compound to be used in the presulfiding process.

After the organic sulfur compound has been incorporated into the catalyst, the resulting material need be dried to remove excess water. To this end use may be made of conventional equipment, such as ovens and belt driers.

Next, the resulting presulfided catalyst should be activated in order to bring the catalyst into the sulfided form. Such activation is carried out by passing hydrogen gas, in combination or not with a hydrocarbon-containing feed, over the presulfided catalyst at a temperature in the range of 100° C. to 600° C., preferably in the range of 100° C. to 400° C., and a hydrogen pressure in the range of 1 to 300 bars, preferably 5 to 100 bars. This process step may be carried out either ex situ, i.e. in a separate reactor, or in situ, i.e. in the reactor in which the catalyst will be used.

The catalyst thus prepared is suitable to be used in the catalytic hydrotreatment of hydrocarbon-containing feeds. The most significant of these processes are hydrodesulfurization, hydrodenitrogenation, hydrodemetallization, hydroreforming, hydroisomerization, and hydrocracking. The process equipment to be used and the conditions under which the reactions are carried out vary with the process used and have been described in detail in the prior art. See for instance M. De Wind et al., Proceedings of symposium on catalyst performance testing, Mar. 28/29, 1988, pp. 29–42; published by Unilever Research Laboratories, Vlaardingen, The Netherlands. Very generally, the following reaction conditions apply here: temperatures in the range of 200° C. to 550° C., LHSV values in the range of 0.1 to 10 hours$^{-1}$, hydrogen partial pressures in the range of 10 to 300 bars, and hydrogen/hydrocarbon ratios in the range of 50 to 5000 Nm$^3$/m$^3$.

The invention will be further described in the following examples.

EXAMPLE 1

Presulfiding

In a rotating impregnator 1 kg of fresh catalyst KF-165 ® (ex Akzo Chemicals; catalyst composition: 15.4% by weight of MoO$_3$, 4.2% by weight of CoO, alumina; PV (H$_2$O): 0.46 ml/g) was impregnated at room temperature with an aqueous solution prepared by dissolving 0.88 moles of diammonium salt of 2,5-dimercapto-1,3,4-thiadiazole in such an amount of water as to obtain a final volume of 460 ml, use being made of the pore volume saturation technique. Next, the resulting material was dried in an oven for 15 hours at 100° C. The sulfur content of the catalyst thus presulfided and the sulfur content of the catalyst in the sulfided state calculated therefrom are given in Table 1.

Activation and hydrotreatment 75 ml of the resulting catalyst were introduced into a reactor tube. The reactor tube had a diameter of 21 mm and in longitudinal direction it contained a thermocouple tube with a diameter of 6 mm. The length of the catalyst bed was 45 cm. Activation was as follows.

First the reactor was flushed with nitrogen to remove air. Next, hydrogen gas was passed upwardly over the catalyst at a pressure of 60 kg/cm$^2$ and at a rate of 65 l/hour, the temperature being increased from room temperature to 150° C. in a period of 1 hour. Subsequently, a light gas oil (LGO), the relevant data on which is provided in Table 2, was admixed in the hydrogen gas stream at a rate of 200 ml/hour and the temperature was incrementally raised to 368° C. over a period of 12 hours.

The catalyst thus activated was used in the same reactor for hydrotreating a vacuum gas oil (VGO), the relevant data on which is provided in Table 2. A first treatment was carried out at a temperature of 368° C., a hydrogen partial pressure of 50 bars, a hydrogen to oil ratio of 300 Nm$^3$/m$^3$, and an LHSV of 2.67 hours$^{-1}$. Subsequently, a treatment was carried out at an LHSV of 1.33 hours$^{-1}$, given otherwise identical conditions. The data obtained was used to determine the relative volume activity RVA) of the catalyst for desulfurization, the catalyst according to EP-A 0,153,233 described in Example 6 below being used as standard. The value found for the RVA is given in Table 1.

EXAMPLE 2

The procedures described in Example 1 were repeated, except that presulfiding was carried out using 0.64 moles of diammonium salt of ethylene bis(dithiocarbamic acid). The results are given in Table 1.

EXAMPLE 3

The procedures described in Example 1 were repeated, except that presulfiding was carried out using 1.32 moles of 3,4-dithia adipic acid. The results are given in Table 1.

EXAMPLE 4

The procedures described in Example 1 were repeated, except that presulfiding was carried out using 1.27 moles of dimethylammonium salt of dimethyldithiocarbamic acid. The results are given in Table 1.

EXAMPLE 5

The procedures described in Example 1 were repeated, except that presulfiding was carried out using 1.32 moles of 2,2'-dithiodiethanol. the results are given in Table 1.

EXAMPLE 6 (comparative example)

A fresh KF-165 ® catalyst was presulfided using an aqueous solution of diammonium sulphide as described in EP-A 0,153,233, p. 19, l. 12 through p. 20, l. 20. After the second drying step in a nitrogen atmosphere the sulfur content of the presulfided comparative catalyst was 7.4% by weight. From it is calculated for the catalyst in the sulfided state a sulfur content of 8.0% by weight, which within the measuring error corresponds to the amount of 8.6 g of sulfur per 100 g of catalyst mentioned in the publication.

The presulfided catalyst was then activated and used to hydrotreat VGO in the manner described in Example 1. The activity of this catalyst was arbitrarily rated 100. See Table 1.

The results listed in Table 1 clearly show that the catalysts which were presulfided by the process according to the invention display a desulfurizing activity superior to that of the catalyst according to EP-A 0,153,233.

TABLE 1

| | Sulfur Content (wt. %) | | |
|---|---|---|---|
| Example | Presulfided | Sulfided | RVA |
| 1 | 7.3 | 7.8 | 155 |
| 2 | 7.1 | 7.6 | 152 |
| 3 | 6.8 | 7.8 | 138 |
| 4 | 6.7 | 7.5 | 141 |
| 5 | 7.1 | 7.8 | 152 |
| 6* | 7.4 | 8.0 | 100 |

*Comparative Example

TABLE 2

| Feed | N (wt. ppm) | S (wt. %) | Density 50° C. (g/ml) | Boiling point fract. (°C.) | | | | |
|---|---|---|---|---|---|---|---|---|
| | | | | 10% | 30% | 50% | 70% | 90% |
| LGO | 92 | 1.17 | 0.8145 | 224 | 262 | 288 | 313 | 349 |
| VGO | 970 | 2.93 | 0.9018 | 391 | 421 | 451 | 486 | 527 |

EXAMPLE 7

Sulfur retention test

This test provides a simple yet effective method of determining the suitability for use as (pre)sulfiding reagent of sulfur compounds.

The test is carried out as follows.

Use is made of an impregnated KF-165 ® catalyst subsequently dried at 100° C.; see for instance the presulfided catalyst prepared in Example 1. It is heated for 16 hours in an atmosphere of static air, in an oven, at 160° C. Care should be taken that the catalyst material is spread evenly and has a maximum bed height of 1 cm.

Next the composition of the starting material and the product material is determined by chemical analysis, and the sulfur content is calculated on the basis of the total weight excluding i) water that may be present and ii) the constituents other than sulfur originating from the original sulfur compound. From the resulting sulfur contents of the starting material (Ss) and the product material (Sp) can be calculated the sulfur retention (Sr) by the formula $$Sr = \frac{Sp}{Ss} \times 100\%$$

Table 3 lists the Sr values for the compounds used in the preceding Examples.

TABLE 3

| Example | Sr (%) |
|---------|--------|
| 1 | 92 |
| 2 | 91 |
| 3 | 98 |
| 4 | 80 |
| 5 | 75 |
| 6* | 51 |

*Comparative Example

As a rule, those sulfur compounds are suited to be used in the presulfiding process according to the invention which in the sulfur retention test have an Sr value of at least 55%, preferably of at least 65%, and more particularly of at least 80%.

EXAMPLE 8

Presulfiding

In a rotating impregnator 1 kg of a fresh commercial mild-hydrocracking catalyst (catalyst composition: 10.0 wt.% of $MoO_3$, 2.7 wt.% of CoO, silica-alumina support; PV ($H_2O$): 0.60 ml/g) was impregnated at room temperature with an aqueous solution prepared by dissolving 0.86 moles of 2,2'-dithiodiethanol in such an amount of water as to obtain a final volume of 600 ml, use being made of the pore volume saturation technique. Next, the resulting material was dried in an oven for 15 hours at 100° C. The sulfur content of the catalyst thus presulfided was 4.8 wt.% and that of the catalyst in the sulfided state calculated therefrom 5.2 wt.%.

Activation and hydrotreatment 100 ml of the resulting catalyst were introduced into the reactor tube, the details of which are described in Example 1. Activation was carried out according to the procedure also described in Example 1.

The catalyst thus activated was used in the same reactor for hydrotreating a vacuum gas oil, the relevant data on which is given in Table 2.

For a first hydrodesulfurization and hydrodenitrogenation treatment the conditions (i) included a temperature of 370° C., a hydrogen partial press of 50 bars, a hydrogen to oil ratio of 600 $Nm^3/m^3$ and an LHSV of 1.50 hours$^{-1}$. After a subsequent change for a mild-hydrocracking treatment the conditions (ii) included a temperature of 407° C., a hydrogen partial pressure of 50 bars, a hydrogen to oil ratio of 320 $Nm^3/m^3$ and an LHSV of 0.5 hours$^{-1}$.

The data obtained was used to determine the RVA of the catalyst for hydrodesulfurization (HDS), hydrodenitrogenation (HDN) and mild-hydrocracking (MHC), the catalyst according to EP-A 0,153,233 described in Example 9 below being used as standard. The RVA values are given in Table 4.

EXAMPLE 9 (comparative example)

A fresh commercial mild-hydrocracking catalyst (the same type as used in Example 8) was presulfided using an aqueous solution of diammonium sulfide as described in EP-A 0,153,233, p. 19, 1. 12 through p. 20, 1. 20. After the second drying step in a nitrogen atmosphere the sulfur content of the presulfided comparative catalyst was 5.0 wt.%. From it is calculated for the catalyst in the sulfided state a sulfur content of 5.3 wt.%.

The presulfided catalyst was then activated and used to hydrotreat VGO in the manner described in Example 8. The RVA values of this catalyst were arbitrarily rated 100. See Table 4.

The results in Table 4 show that the catalyst which was presulfided by the process according to the invention displays activities superior to those of the catalyst according to EP-A 0,153,233.

TABLE 4

| | RVA | | | | |
|---|---|---|---|---|---|
| | Condition I | | Condition II | | |
| Example | HDS | HDN | HDS | HDN | MHC |
| 8 | >200 | 163 | >200 | 120 | 125 |
| 9* | 100 | 100 | 100 | 100 | 100 |

*Comparative Example

EXAMPLE 10

A catalyst was prepared generally in accordance with the method set forth in Example 1 except that presulfiding was carried out using dimethylsulfoxide. The sulfur content of the dried catalyst was 5% by weight.

A sulfur retention test was carried out according to Example 7, the $S_r$ value found was 61%.

COMPARATIVE EXAMPLE 11

A catalyst was prepared essentially in accordance with the process described in Miura et al. by impregnating KF-165 ® with an aqueous solution of dimethylsulfoxide, drying it at 110° C. and calcining at 537° C. The sulfur content of the obtained catalyst was 0.7% by weight, indicative of a loss of sulfur highly significant with respect to the desulfurizing activity of the catalyst.

We claim:

1. A process for the preparation of a catalyst useful in the catalytic hydrotreatment of hydrocarbon-containing feeds comprising:
   a) obtaining a catalyst comprising a carrier material having deposited thereon one or more metals or metal compounds catalytically active for the hydrotreatment of hydrocarbon-containing feeds:
   b) contacting the catalyst of step a) with an aqueous medium containing an organic sulfur compound to incorporate an effective amount of the organic sulfur compound into the catalyst; the organic sulfur compound being selected from the group consisting of
   salts of ethylene bis(dithiocarbamic acid),
   salts of 2,5-dimercapto-1,3,4-thiadiazole,
   salts of dimethyldithiocarbamic acid,
   thiourea,
   ammonium thiocyanate,
   dimethyl sulfoxide,
   3,4-dithia adipic acid,
   salts of 3,4-dithia adipic acid, and
   2,2'-dithiodiethanol;
   c) drying the sulfur-containing catalyst of step b); and
   d) activating the dried sulfur-containing catalyst of step c) by contacting said catalyst with hydrogen gas at a temperature of from 100° C. to 600° C., calcining not being effected between steps b) and d).

2. The process of claim 1 wherein the organic sulfur compound has at least two sulfur atoms in the molecule.

* * * * *

UNITED STATES PATENT AND TRADEMARK OFFICE
CERTIFICATE OF CORRECTION

PATENT NO. : 5,139,990

DATED : August 18, 1992

INVENTOR(S) : Jan I. de Jong et al.

It is certified that error appears in the above-identified patent and that said Letters Patent is hereby corrected as shown below:

Title page, second line of Title     "RESULFIDED" should be PRESULFIDED.

Signed and Sealed this

Thirty-first Day of August, 1993

Attest:

BRUCE LEHMAN

Attesting Officer     Commissioner of Patents and Trademarks